US011057512B2

(12) United States Patent
Togwe et al.

(10) Patent No.: US 11,057,512 B2
(45) Date of Patent: *Jul. 6, 2021

(54) AUGMENTING MESSAGES BASED ON SENDER LOCATION

(71) Applicant: International Business Machines Corporation, Armonk, NY (US)

(72) Inventors: Thembani Togwe, Lenexa, KS (US); Zachary Greenberger, Raleigh, NC (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,526

(22) Filed: Nov. 22, 2019

(65) Prior Publication Data

US 2020/0092412 A1 Mar. 19, 2020

Related U.S. Application Data

(63) Continuation of application No. 15/982,307, filed on May 17, 2018, now Pat. No. 10,547,734.

(51) Int. Cl.
*H04M 1/72436* (2021.01)
*G06F 3/0482* (2013.01)
(Continued)

(52) U.S. Cl.
CPC .. *H04M 1/72436* (2021.01); *G06F 16/24575* (2019.01); *G06F 16/29* (2019.01);
(Continued)

(58) Field of Classification Search
CPC ......... H04M 1/72552; H04M 1/72572; H04M 1/72436; H04M 1/72457; G06F 3/0488;
(Continued)

(56) References Cited

U.S. PATENT DOCUMENTS 7,619,584 B2 11/2009 Wolf
9,237,231 B2 1/2016 Swanburg et al.
(Continued)

OTHER PUBLICATIONS

Office Action (dated Oct. 2, 2018) for U.S. Appl. No. 15/982,307, filed May 17, 2018.
(Continued)

*Primary Examiner* — Farid Seyedvosoghi
(74) *Attorney, Agent, or Firm* — Schmeiser, Olsen & Watts, LLP; Stephanie Carusillo

(57) ABSTRACT

A system and method for augmenting a graphical user interface by filtering options within a text message displayed within the graphical user interface includes determining that a content of the text message includes a plurality of options, receiving a location information of the sending device, the location information of the sending device being used to determine a venue corresponding to a physical location of the sending device, determining that the venue corresponding to the physical location of the sending device is relevant to the plurality of options, retrieving a contextual information from the venue about the plurality of choices, and augmenting the graphical user interface of the sending device by appending the contextual information to the plurality of options of the text message, such that the graphical user interface of the sending device simultaneously displays both the contextual information and the plurality of options.

18 Claims, 13 Drawing Sheets

(51) Int. Cl.
  *H04L 12/58* (2006.01)
  *G06F 16/29* (2019.01)
  *G06F 16/435* (2019.01)
  *G06F 16/2457* (2019.01)
  *H04W 4/02* (2018.01)

(52) U.S. Cl.
  CPC ............ *G06F 16/435* (2019.01); *H04L 51/08* (2013.01); *H04L 51/20* (2013.01); *H04W 4/02* (2013.01)

(58) Field of Classification Search
  CPC ........ G06F 3/0482; G06F 1/163; G06F 16/29; G06F 16/435; G06F 16/24575; H04W 4/02; H04W 4/12; H04L 51/30; H04L 51/22; H04L 51/08; H04L 51/20
  USPC .................. 455/466; 705/14.49, 14.57, 14.4, 705/15–4.58
  See application file for complete search history.

(56) References Cited

U.S. PATENT DOCUMENTS

| | | | |
|---|---|---|---|
| 2010/0251086 A1* | 9/2010 | Haumont | G06F 40/134 715/205 |
| 2010/0262554 A1* | 10/2010 | Elliott | G01C 21/20 705/323 |
| 2011/0185024 A1 | 7/2011 | Ramarao et al. | |
| 2011/0238762 A1* | 9/2011 | Soni | H04L 51/32 709/206 |
| 2012/0239761 A1* | 9/2012 | Linner | G06F 40/279 709/206 |
| 2016/0308794 A1 | 10/2016 | Kim et al. | |
| 2019/0356769 A1 | 11/2019 | Togwe et al. | |

OTHER PUBLICATIONS

Amendment (dated Feb. 4, 2019) for U.S. Appl. No. 15/982,307, filed May 17, 2018.
Final Office Action (dated Apr. 24, 2019) for U.S. Appl. No. 15/982,307, filed May 17, 2018.
Final amendment (dated Jul. 29, 2019) for U.S. Appl. No. 15/982,307, filed May 17, 2018.
Advisory Action (dated Aug. 7, 2019) for U.S. Appl. No. 15/982,307, filed May 17, 2018.
RCE (Aug. 9, 2019) for U.S. Appl. No. 15/982,307, filed May 17, 2018.
Notice of Allowance (dated Sep. 18, 2019) for U.S. Appl. No. 15/982,307, filed May 17, 2018.

* cited by examiner

AUGMENTING MESSAGES BASED ON SENDER LOCATION

This application is a continuation application claiming priority to Ser. No. 15/982,307, filed May 17, 2018, now U.S. Pat. No. 10,547,734, issued Jan. 28, 2020.

TECHNICAL FIELD

The present invention relates to systems and methods for augmenting graphical user interfaces, and more specifically the embodiments of a message augmentation system for augmenting a graphical user interface and/or text message by filtering options within the text message displayed within the graphical user interface.

BACKGROUND

A text message sent to a receiving party that prompts the receiving party to choose between options can be presented to the receiving party within a graphical user interface of a messaging application on the receiving party's device. For example, a text message prepared by a sending party can include a layout that presents each option as a selectable response within the graphical user interface. However, the options lack the necessary information for the user to make an informed decision.

SUMMARY

An embodiment of the present invention relates to a method, and associated computer system and computer program product, for augmenting a graphical user interface and/or text message by filtering options within the text message displayed within the graphical user interface. A processor of a computing system determines that a content of the text message prepared to be sent from a sending device and received by a receiving device includes a plurality of options, the plurality of options being presented in the graphical user interface of the sending device. A location information of the sending device is received, the location information of the sending device being used to determine a venue corresponding to a physical location of the sending device. A venue corresponding to the physical location of the sending device is determined to be relevant to the plurality of options. A contextual information from the venue about the plurality of choices is received. The graphical user interface of the sending device is augmented by appending the contextual information to the plurality of options of the text message, such that the graphical user interface of the sending device simultaneously displays both the contextual information and the plurality of options, wherein, when the text message is received by the receiving device from the sending device, a graphical user interface of the receiving device displays both the contextual information and the plurality of options.

DETAILED DESCRIPTION

Currently, a text message prepared by a sending party can include a layout that presents each option as a selectable response within the graphical user interface. However, the options lack the necessary information (e.g. price, availability, product information, etc.) for the user to make an informed decision and choose an optimum option. Embodiments of the present invention may gather product information/data based on a sender's location and filtering the information/data to a receiver, so that the receiver can make a most appropriate choice from the options sent by the sender.

Figure 1:
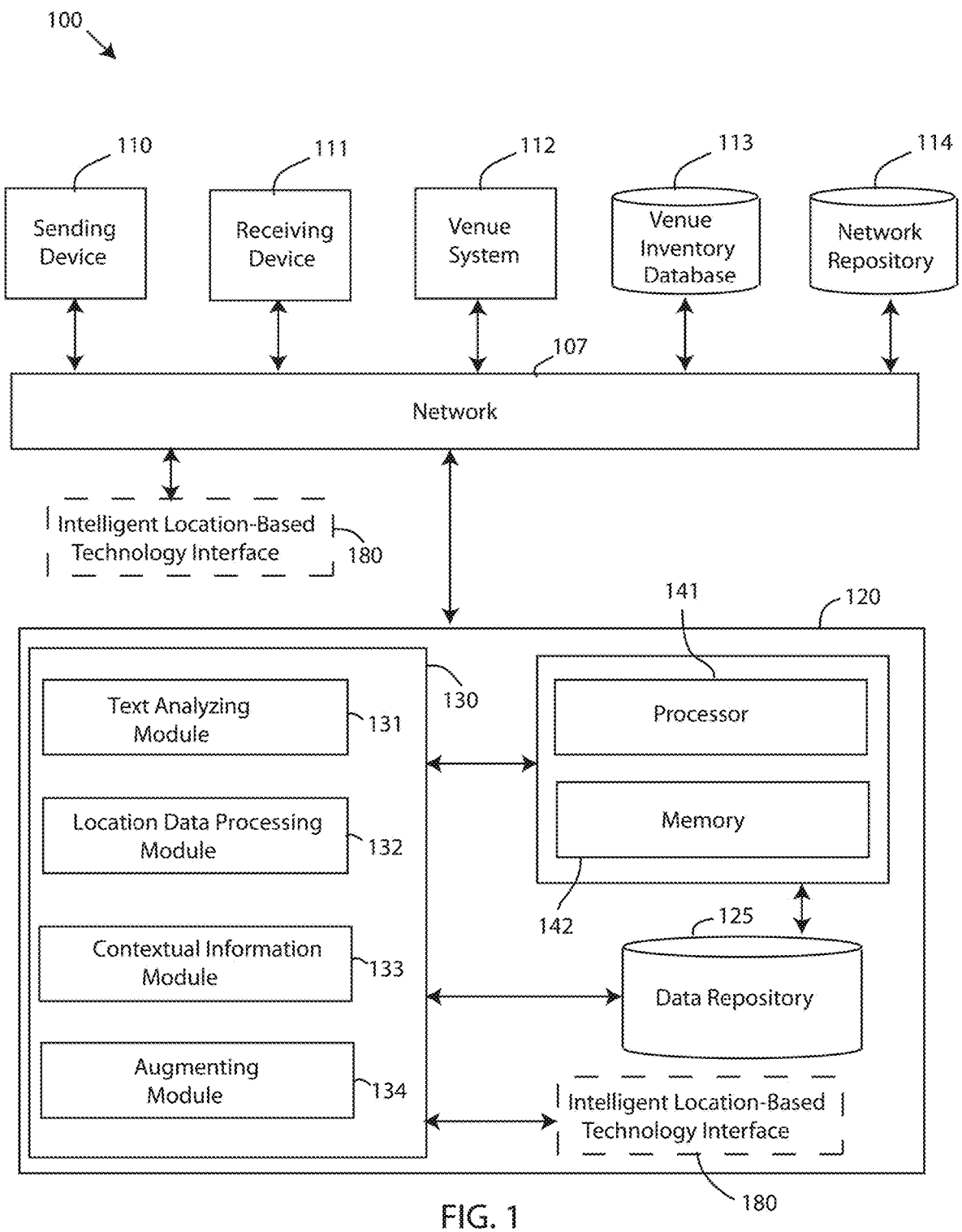
FIG. 1 depicts a block diagram of a message augmentation system, in accordance with embodiments of the present invention.

Referring to the drawings, FIG. 1 depicts a block diagram of a message augmentation system 100, in accordance with embodiments of the present invention. Embodiments of the message augmentation system 100 may be a system for augmenting a graphical user interface and/or text message by filtering options within the text message displayed within the graphical user interface, so that the graphical user interface is augmented, changed, modified, etc. to deliver a contextual information about the options within the message based on a venue corresponding to a sender's location. Embodiments of the message augmentation system 100 may be useful for recipients of messages prompting a decision from the recipient, which improve an efficiency of the decision making based on a physical location of the sender. For example, the message augmentation system 100 may tailor any given message with options to the sender's location by providing contextual information otherwise not available to the recipient when making a decision. In other words, the message augmentation system 100 may allow message modification and/or graphical user interface augmentation to include contextual information based on a sender's location, without requiring the recipient to research the contextual information to assist the decision, thereby increasing a response time from the recipient and saving additional computer resources to search and locate the contextual information. Examples of a message that can be altered by the message augmentation system 100 may be a text message, an instant message, a real-time text transmission, online chat communication, multicast transmission, and the like. The messages between sender and recipient may be supported by one or more message application loaded on the sender and recipient device, such as a native application, social media platform, and other third party messaging applications.

Embodiments of the message augmentation system 100 may be a graphical user interface augmentation system, a product messaging shortcut system, a message filtering system, a location based message altering system, a location based filtering system, a graphical user interface modification system, a contextual information providing system, and the like. Embodiments of the message augmentation system 100 may include a computing system 120. Embodiments of the computing system 120 may be a computer system, a computer, a server, one or more servers, a backend computing system, and the like.

Furthermore, embodiments of message augmentation system 100 may include a sending device 110, a receiving device 111, a venue system 112, and a venue inventory database 113 that are communicatively coupled to the computing system 120 over a network 107. For instance, information/data may be transmitted to and/or received from the sending device 110, the receiving device 111, the venue system 112, and the venue inventory database 113 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing information of the sender/recipient, product information, catalogs, location information, user activity, user preferences, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging message data, recipient's choice, product information, contextual information, location data, user preference data, layouts, appearances, and the like, to generate both historical and predictive reports regarding a particular user or a particular tailored graphical user interface, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the sending device 110 may be a computing device, a computer, a desktop computer, a cell phone, a mobile computing device, a tablet computer, a laptop computer, a wearable computing device, a smartwatch, an augmented reality device, and the like, which may be used to prepare and send a message to another device, such as receiving device 111, as well as receive a response to the message. The sending device 110 may include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like. Embodiments of the receiving device 111 may be a computing device, a computer, a desktop computer, a cell phone, a mobile computing device, a tablet computer, a laptop computer, a wearable computing device, a smartwatch, and the like, which may be used to receive a message from the sending device 110, as well as prepare and send a message to the sending device 111. The receiving device 111 may include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like.

Referring still to FIG. 1, embodiments of the message augmentation system 100 may include a venue system 112. Embodiments of the venue system 113 may be communicatively coupled to the computing system 120 over network 107. Embodiments of the venue system 113 may be a network, a computing system, a network of computers, a plurality of computers, databases, networks, and the like, associated with a particular venue, which can be controlled and/or used by a management of the venue to receive information/data transmitted by the computing system 120 for gathering contextual information, such as product information (e.g. price, availability, etc.). Embodiments of a venue associated with the venue system 113 may be a location, a building, a place, a market, or any establishment that offers objects, services, products, etc. for sale. Exemplary embodiments of the venue associated with the venue system 113 may be a retailer, a grocery store, a home improvement store, a shopping center, a store, a business, a recreational facility, a restaurant, a service operation, and the like. Moreover, embodiments of the message augmentation system 100 may include a venue inventory database 113. Embodiments of the venue inventory database 113 may be a database or other storage device maintained or otherwise controlled by the venue, which includes information/data (e.g. price, availability, price per pound, etc.) regarding items, goods, products, services, options, etc. that forms an inventory of the venue. The inventory database 113 may also be controlled by third party application, such as BRICK-SEEK and even crowd-sourced information such as that available on BETTERBIDDING or other deal websites and applications.

Furthermore, embodiments of the computing system 120 of the message augmentation system 100 may be equipped with a memory device 142 which may store various data/information/code, and a processor 141 for implementing the tasks associated with the message augmentation system 100. In some embodiments, an augmentation application 130 may be loaded in the memory device 142 of the computing system 120. Embodiments of the augmentation application 130 may be an interface, an application, a program, a module, or a combination of modules. In an exemplary embodiment, the augmentation application 130 may be a software application running on one or more back end servers, servicing one or more sending devices 110 and one or more receiving devices 1112, wherein a user interface portion of the software application (e.g. a messaging software application) may also run on the sending device 110 and the receiving device 111.

The augmentation application 130 of the computing system 120 may include a text analyzing module 131, a location data processing module 132, a contextual information module 133, and an augmenting modification module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the text analyzing module 131 may include one or more components of hardware and/or software program code for determining that a content of the text message prepared to be sent from a sending device 110 and received by a receiving device 111 includes a plurality of options. For instance, the text analyzing module 131 may, in response to detecting that a user is typing a message using a messaging application on the sending device 110, or in real-time as the user is typing the message, analyze a content of the message to determine whether the message is asking a recipient a question, with a plurality of potential answers within the message. The content of the message may be analyzed by a text analysis system that may parse, identify, etc. words using, for example, a natural language processing technique, to analyze the content (e.g. words) of the message. Embodiments of the text analyzing module 131 may analyze the content to determine whether the content of the message contains one or options that the recipient may select from in response to receiving the message. In an exemplary embodiment, the text analyzing module 131 may determine that the message created by the sender is a request that the user decide between one or more options.

Figure 2:
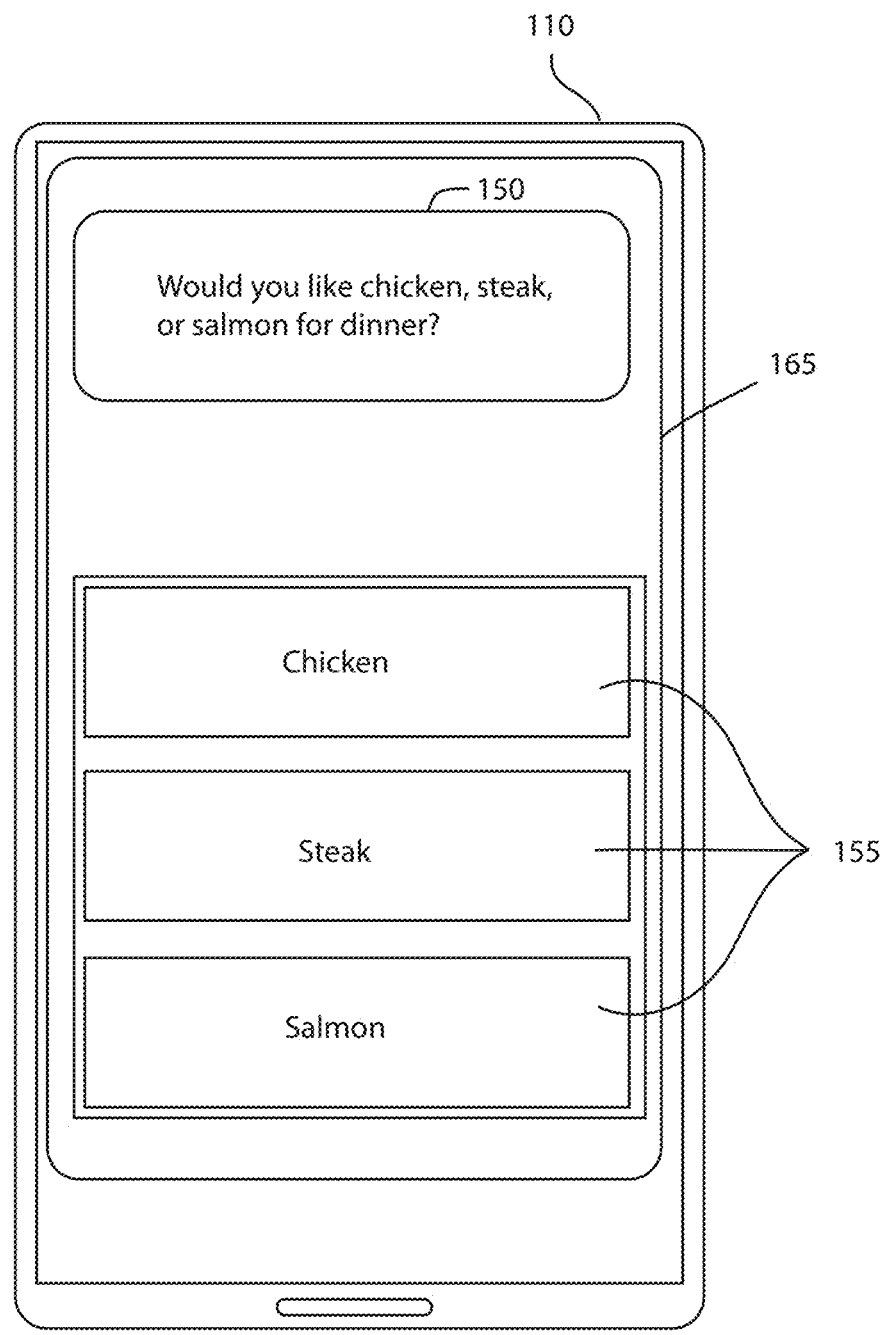
FIG. 2 depicts a graphical user interface of a sending device showing a message and a plurality of options, in accordance with embodiments of the present invention.

A graphical user interface of a messaging application loaded on the sending device 110 may display the text as the sender types the message. The text analyzing module 131 may determine that the content of the message includes a plurality of options for the recipient to choose from. The plurality of options may be identified by the text analyzing module 131, and presented in a separate location on the screen of the sending device 110. FIG. 2 depicts a graphical user interface (GUI) 165 of the sending device 110 showing a message 150 and a plurality of options 155, in accordance with embodiments of the present invention. The graphical user interface 165 may separately display the message 150 and the plurality of options 155. In FIG. 2, the text analyzing module 131 may analyze, parse, or otherwise process the text of the message, either in real-time as the sender types the message, after a pause following a punctuation mark (e.g. question mark), or a combination thereof, to extract a plurality of options 155 for separate, clear presentation. In an exemplary embodiment, the message 150 may be input by the sender as "Would you like chicken, steak, or salmon for dinner?" The text analyzing module 131 may determine that the sender typed a question with a plurality of options that the recipient can choose from. In the message 150 example provided above, the text analyzing module 131 may extract "chicken," "steak" and "salmon" as plurality of options 155. The plurality of options 155 may be presented within the GUI 165 as separate, selectable options. In an exemplary embodiment, the message 150 and the plurality of options 155 are generated within the GUI 165 prior to sending the message communication to the receiving device 111. The plurality of options 155 shown in FIG. 2 lack any context or additional information that may influence the recipient's decision.

Referring still to FIG. 1 embodiments of the computing system 120 may include a location data processing module 132. Embodiments of the location data processing module 132 may include one or more components of hardware and/or software program code for receiving, obtaining, or otherwise acquiring a location information of the sending device 110. The location information of the sending device may be used to determine a venue corresponding to a physical location of the sending device 110. In an exemplary embodiment, the location data module 132 receives location data, micro-location data, and location-related metadata about the sending device 110, from the sending device 110 (e.g. via GPS module on sending device 110). The location information may be received from the sending device 110 in response to a request from the computing system 120, or may automatically sent to the computing device 120 when the messaging application is launched at the sending device 110. The location information may be coordinates, a global position, an address, and the like.

In further embodiments, the location information may be automatically sent from an intelligent location-based technology interface 180, in response to the computing system 120 detecting that the message 150 includes a plurality of options selectable by the recipient. The location data module 132 may send a request to the interface 180 connected with the sending device 110 to obtain location information, such as a physical location (e.g. coordinates) and/or venue identity of the venue supporting the interface 180. The location data module 132 may send a request to the interface 180 to confirm a physical location and/or venue location received from a GPS module of the sending device 110. The location data and/or the micro-location data may be used to build a context that can be used for providing additional contextual information to supplement the options 155. For example, the micro-location data may capture a physical location of the sending device 110 within a venue, along with venue-specific location. Embodiments of the location data module 132 may communicate with an intelligent location-based technology interface 180 to obtain or otherwise receive the micro-location data of the sending device 110. Embodiments of the interface 180 may be a component of the computing system 120, or may be external to the computing system 120, and connected to the computing system 120 over network 107.

Figure 3:
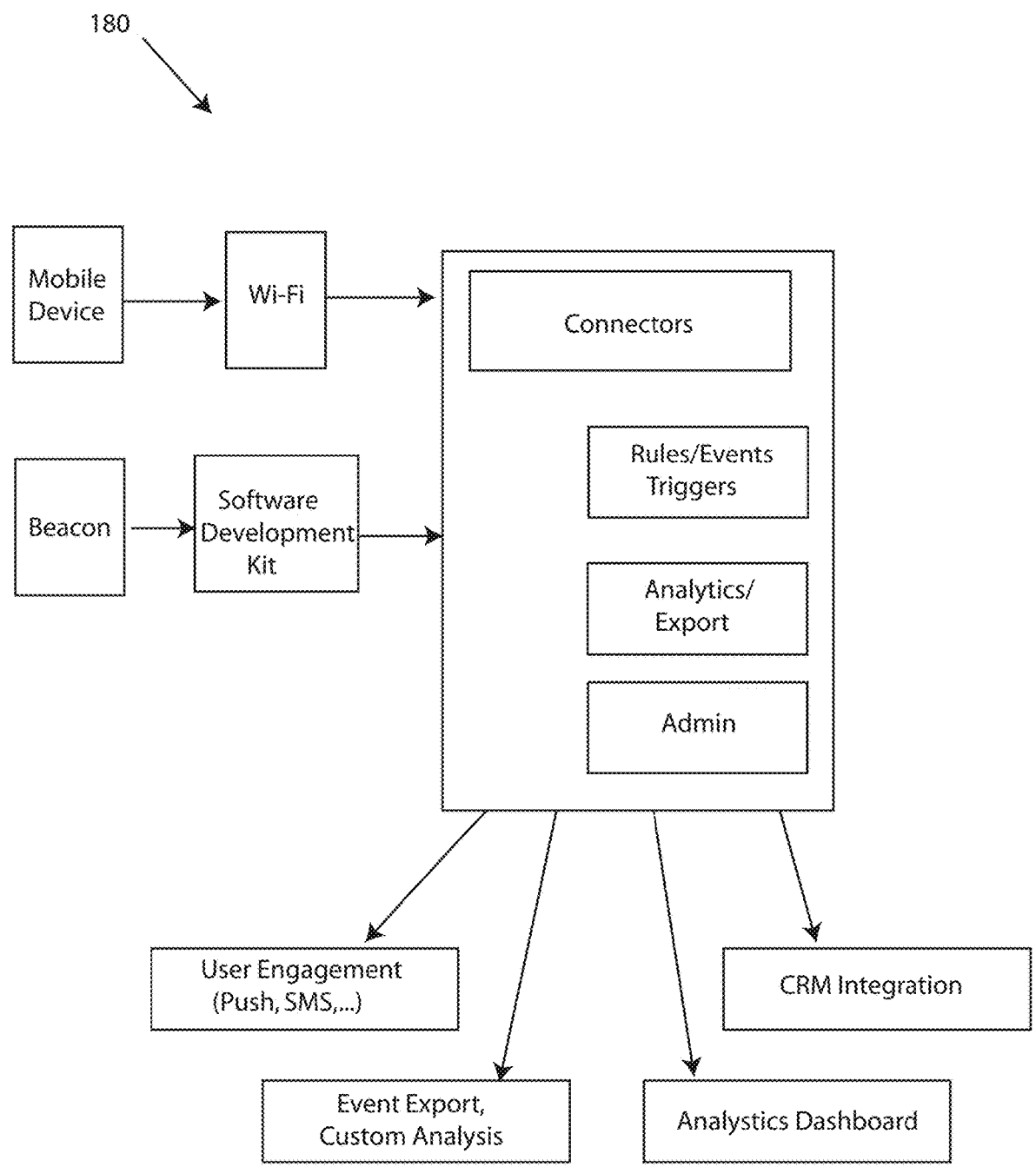
FIG. 3 depicts a block diagram of an embodiment of an intelligent location-based technology interface, which may be part of the message augmentation system depicted in FIG. 1, in accordance with embodiments of the present invention.

FIG. 3 depicts a block diagram of an embodiment of an intelligent location-based technology interface, which may be part of the message augmentation system 100 depicted in FIG. 1, in accordance with embodiments of the present invention. Interface 180 may enable venues associated with public spaces, healthcare, travel, stadiums, retail stores, grocery stores, recreation, shopping malls, and transportation businesses to extend customer service and support through mobile devices of the users utilizing the venue. Embodiments of the interface 180 may detect a sending device 110 that is communicating through radio signals using various protocols. In an exemplary embodiment, interface 180 may support Bluetooth Low Energy (BLE), Wi-Fi 802.11 on 2.4 GHz and 5 GHz radio communication protocols, for example. When a mobile device, such as sending device 110 is detected using one of the supported protocols, a Globally Unique Identifier (GUID) may be assigned for the mobile device. The GUID can be the MAC address for the mobile device 110.

Accordingly, the sending device 110 may be tracked as the sending device 110 moves through the venue. All personally identifiable information (PII) including the MAC address or GUID may be encrypted by using a public key that is provided by the vendor to ensure that the customer data is secure. As the sending device 110 moves through the venue or other venues implementing interface 180, a physical location may be tracked and known in real-time for transmitting to the computing system 120 at a time of message creation by a sender utilizing the sending device 110. The location data generated by the interface 180, which may be received and/or processed by the location data module 132, may enable the location data module 132 to identify a venue that corresponds to the physical location of the sending device 110. In other words, the location data module 132 may process the location information to determine the venue that the sending device 110 is presently located in.

Embodiments of the computing system 120 may include a contextual information module 133. Embodiments of the contextual information module 133 may include one or more components of hardware and/or software program for determining that the venue corresponding to the physical location of the sending device 110 is relevant to the plurality of options 155 extracted from the message, and retrieving a contextual information from the venue about the plurality of options 155, in response thereto. For instance, the contextual information module 133 may analyze whether the venue/location of the sending device 110 is relevant to the plurality of options 155 from the message 150, and if the venue/location is determined to be relevant, then the contextual information module 133 may retrieve or otherwise receive additional information/data regarding the options 155. Embodiments of the contextual information module 133 may communicate with the venue system 113 of the venue or location of the sending device 110 to determine that the venue is relevant or otherwise correlates to the options 155 of the message 150. The venue system 112, which could be a website of the venue, or one or more computer networks associated with the venue, may be analyzed, parsed, scanned, searched, inspected, etc. for a context that correlates or otherwise relates to or is associated with the options 155 of the message 150. Embodiments of the contextual information module 133 may use a combination of natural language techniques, cognitive applications/engines, and visual recognition engines to determine a context, content, and relevancy of the venue available on the one or more venue systems 112 or search engine results for comparison with the content of the notification message.

Moreover, embodiments of the contextual information module 133 may compare the determined context and content from the venue system 112 with the content of the options 155 within the message 150. For instance, keywords, texts, insights, or other acquired computer readable information associated with the venue system 112 and other venue-specific sources may be compared with keywords, texts, insights, or other computer readable information associated with the options 155. Based on the comparison, the contextual information module 133 may determine that the venue that the sending device 110 is located in may be relevant or otherwise correlate to the options 155. In an exemplary embodiment, the contextual information module 133 may determine from the venue system 112 or other sources, such as search results from a search engine, that the venue is a grocery store, which offers food and other products for sale. In the example shown in FIG. 2, the contextual information module 133 may determine that the venue of a grocery store is relevant to "chicken," "steak", and "salmon" because the grocery store offers those items for sale. The contextual module 133 may determine whether a venue is relevant to the plurality of options 155 if the venue provides an option to purchase the plurality of options 155.

Further, relevancy may be determined by the contextual information module 133 if the sending device 110 is within a predetermined threshold distance from a venue. For example, the location information of the sending device 110 established by GPS information of the sending device 110, cell tower channel connections, location based application activity, etc. may be used to search for nearby venues that are relevant to the options 155. The contextual information module 133 may determine a type of venue that would be relevant to the options 155 (e.g. venue that sells the options), and then perform a search for a nearest relevant venue. If the nearest venue is within a predetermined distance (e.g. feet, less than a mile, walking distance, etc.) from a current position of the sending device 110, then the contextual information module 133 may determine that the location of the sending device 110 is relevant, and may thus proceed to retrieving contextual information of the options 155 based on the venue corresponding to or within a predetermined distance threshold of the physical location of the sending device 110. If the contextual information module 133 determines that the venue is either not relevant or the sending device 110 is not within a predetermined distance threshold from a relevant venue, then the contextual information 133 may withhold retrieving the additional details and not modify the GUI 165 of the sending device 110.

If the contextual information module 133 of the computing system 120 determines that the physical location of the sending device 110 at a time of creating or preparing to send the message 150 corresponds to a relevant venue or is within a predetermined distance threshold of a relevant venue, then the contextual information module 133 may retrieve a contextual information about the options 155, which can be specific to the particular venue corresponding to the sender's location. For instance, embodiments of the contextual information 133 may access, query, or otherwise communicate with the venue inventory database 113 or similar venue-specific database, to retrieve, obtain, or otherwise receive contextual information regarding the options 155, specific to the venue corresponding to the physical location of the sending device 110. Embodiments of contextual information may provide a context to the options 155 in addition to simply listing the options 155, for example, by providing additional information, data, details, background, etc. of the options 155 specific to the venue corresponding to the location of the sender. Embodiments of the contextual information may include a price, a brand, an in-store availability, a peak business hour, a current wait time, a real-time metric, a capacity, a price by weight, a related product, and the like. Consistent with the example provided in FIG. 2, the contextual information module 133 may access the database 113 associated with the venue to determine a "price per pound" of "chicken," "steak," and "salmon." In other example, the contextual information retrieved by the contextual information module 133 may be a price for options 155 sold in a retail venue, a brand of the options 155 offered by a retail venue, a real-time metric, such as current occupancy of multiple nearby restaurant venues suggested by a sender for a recipient to meet the sender if the sender for, a capacity of a stadium venue, a related product, and the like.

Figure 4:
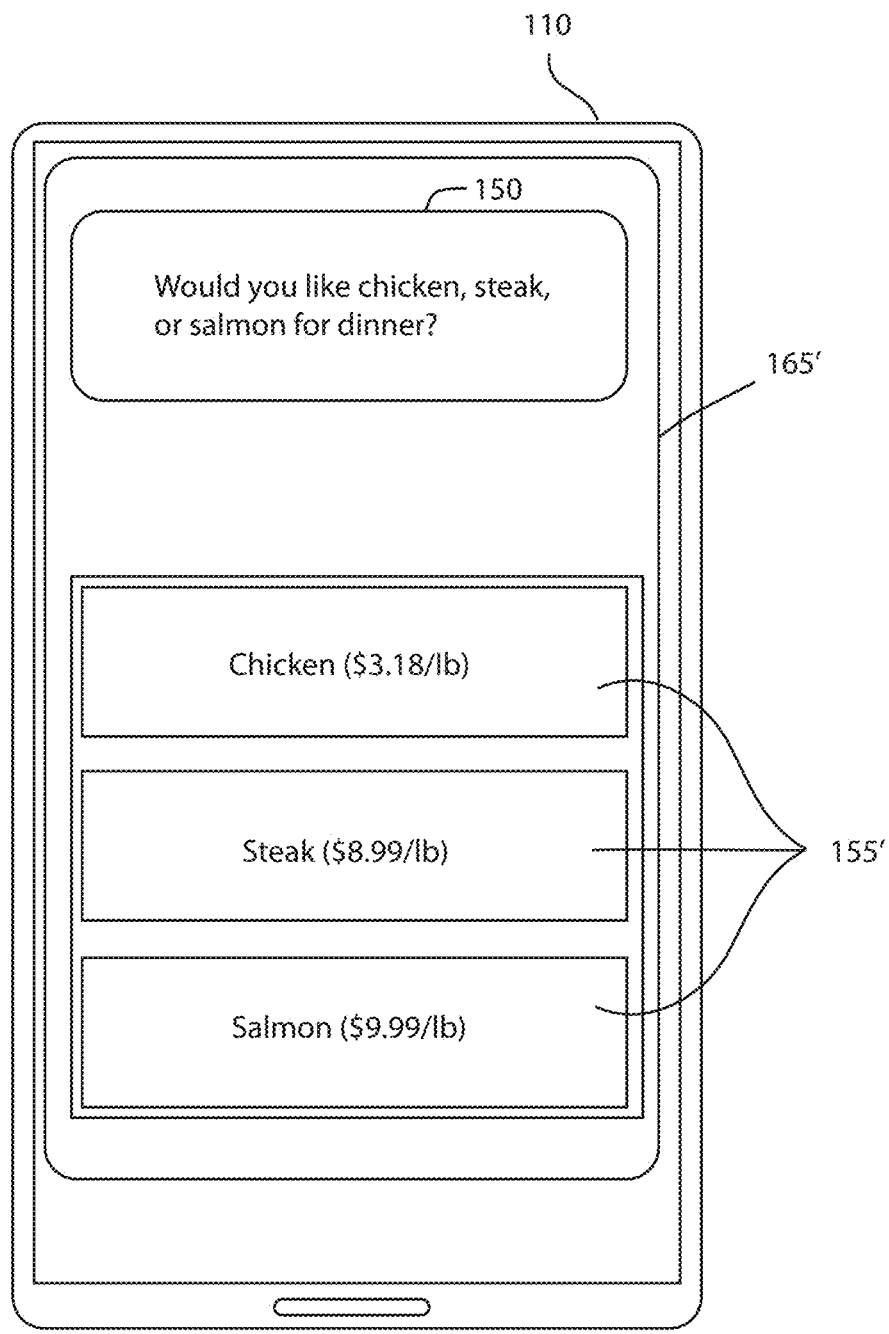
FIG. 4 depicts a graphical user interface of a sending device showing a message and a plurality of options with contextual information, in accordance with embodiments of the present invention.

Referring again to FIG. 1, embodiments of the computing system 120 may include an augmenting module 134. Embodiments of the augmenting module 134 may include one or more components of hardware and/or software program for augmenting the graphical user interface 165 of the sending device 110 by appending the contextual information to the plurality of options 155 of the text message 150, such that the graphical user interface 165' of the sending device 110 simultaneously displays both the contextual information and the plurality of options 155'. When the text message is received by the receiving device 111 from the sending device 110, a graphical user interface 167' of the receiving device 111 displays both the contextual information and the plurality of options 157'. FIG. 4 depicts a graphical user interface 165' of a sending device 110 showing a message and a plurality of options with contextual information 155', in accordance with embodiments of the present invention. Embodiments of the augmenting module 134 may augment, change, alter, adjust, change, etc. the graphical interface 165 of the sending device 110 shown in FIG. 2, which shows the options 155, to a modified graphical interface 165' shown in FIG. 4. The GUI 165 may be modified and/or augmented by including, appending, adding, rendering, etc. the contextual information alongside each of the options 155'. In the exemplary embodiment shown in FIG. 4, embodiments of the augmented GUI 165' may present a "price per pound" of "chicken ($3.18/lb)," "steak ($8.99/lb)," and "salmon ($9.99/lb)." The augmenting module 134 may append the contextual information alongside the options 155' to alter the GUI 165' to provide additional information to the eventual recipient. In response to the augmenting module 134 altering from the GUI 165 to the modified GUI 165', the sender may send the message over network 107 to a receiving device 111. Prior to sending the message, the sender may visually see the modified GUI 165', and may make changes accordingly. If the sender males any changes to the message 150, the options 155' may likewise be changed and/or updated accordingly. For instance, if the sender adds an additional option, then the augmentation application 130 of the computing system 120 may repeat some and/or all of the functions described above to adjust or alter the GUI 165 to display the contextual information along with the options 155. The contextual information can be displayed alongside or next to the options 155, or may presented in a separate window within the modified GUI 165'.

Figure 5A:
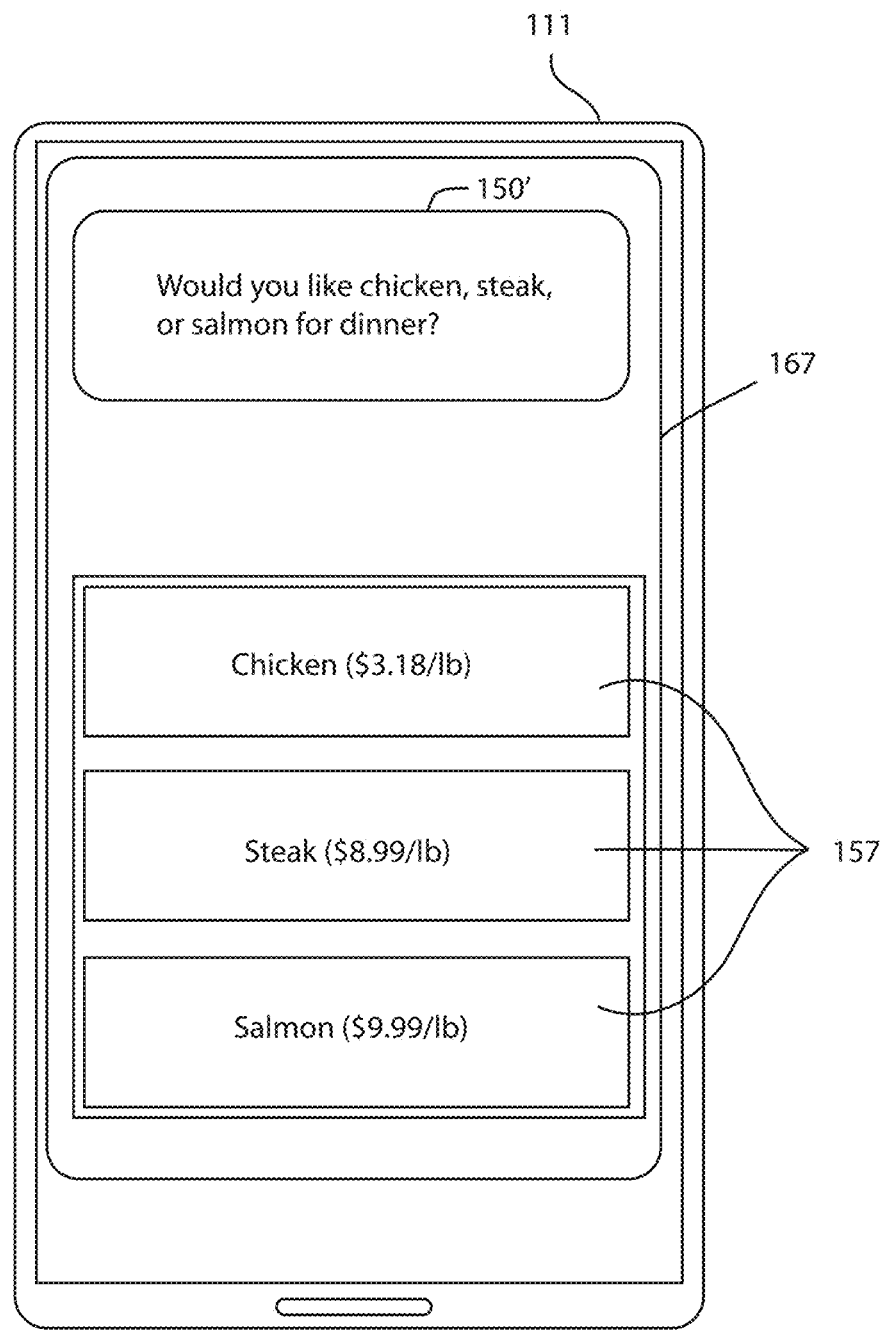
FIG. 5A depicts a graphical user interface of a receiving device showing a received message and a plurality of options with contextual information, in accordance with embodiments of the present invention.

FIG. 5A depicts a graphical user interface 167 of a receiving device 111 showing a received message 150' and a plurality of options with contextual information 157, in accordance with embodiments of the present invention. For instance, the receiving device 111 may receive the message sent by the sending device 110, and when prompted by the recipient to open the message using a messaging application, the graphical user interface 167 may simultaneously display the message 150' and the selected options with contextual information 157. Because the recipient is provided with contextual information, the recipient can make a more informed decision by selecting (e.g. tapping, clicking, etc.) one of the boxes associated with an option displayed by the GUI 167. The recipient is also spared from having to expend time and mobile device usage, such as battery power, processing power, and network data usage, to locate the contextual information.

Figure 5B:
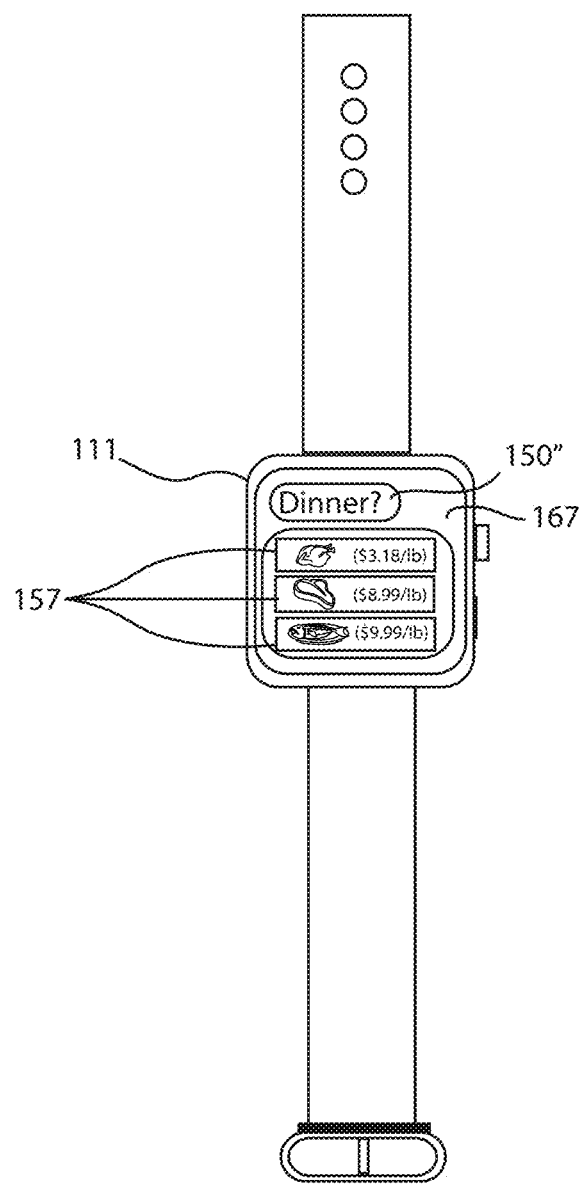
FIG. 5B depicts a graphical user interface of a receiving device with a smaller physical display screen than the receiving device of FIG. 5A, showing a modified message 150" and a modified plurality of options, in accordance with embodiments of the present invention.

FIG. 5B depicts a graphical user interface 167 of a receiving device 111 with a smaller physical display screen than the receiving device of FIG. 5A, showing a modified message 150" and a modified plurality of options 158, in accordance with embodiments of the present invention. Embodiments of the receiving device 111 may include various devices having varying physical sized displays. For instance, a tablet computer may have a larger physical display than a smartphone, and the smartphone may have a larger physical display than a smartwatch. As a result, unmodified content, when displayed on a smartphone, may fit the display screen viewing area, such that the user may not have to scroll or completely unlock their device to read a message 150'. When displayed on a smartwatch, the same unmodified content that may fit the smartphone display may not be viewable on a smaller physical display of a smartwatch, which means that the user may have to completely unlock the smartwatch and scroll down to fully view the message 150' and accompanying options. Embodiments of the augmenting module 134 of the computing system 120 may solve this problem by augmenting the graphical user interface 167 of the receiving device 111 by only displaying a core content of the message 150'. For example, the augmenting module 134 may extract a most relevant portion of the message 150', which may often be a question or a prompt for a user to respond, and display only the most relevant portion to save physical screen space. The most relevant portion of the message 150' may be extracted from the original message by separating the options from the rest of the message, resulting in a truncated message 150'. Thus, the size of the physical display of the device may dictate how the information is being presented to the user. In this example provided, the augmenting module 134 may analyze the original message, "Would you like chicken, steak, or salmon for dinner," and remove the options to extract a truncated, most relevant, or otherwise shortened and modified message, "Dinner?" Moreover, the way that the options within the original message are displayed to the user may be based on the physical limitations of the display of the receiving device 111. For instance, embodiments of the augmenting module 134 may convert the text of the options into icons or other graphical representations (e.g. emoji, animoji, etc.) that take up less physical space on the receiving device 111. Embodiments of the augmenting module 134 (or other module of message augmentation application 130) may recognize the text of the options and swap the text with a suitable icon that can be used instead of the text to save physical space on the display. The options 158 may be represented as a plurality of icons, rather than a text display of the option 158. As shown in FIG. 5B, an icon of a chicken may replace the text "chicken," an icon of a steak may replace the text "steak," and an icon of a fish may replace the text "fish." The modification by the augmenting module 134 may permit the most amount of information to be displayed on a given display, and may modify the information size, length, appearance, etc. on the sending device 110 and/or the receiving device 111.

Furthermore, the augmenting module 134 may automatically determine a size of the display of the receiving device 111 or sending device 110, or the augmentation to icons may be based on a user setting or preference. Alternatively embodiments of the augmenting module 134 or other module of the application 130 may present an option for the sender as the sender is typing the original message to determine whether icons are sent in replace of text.

Figure 6:
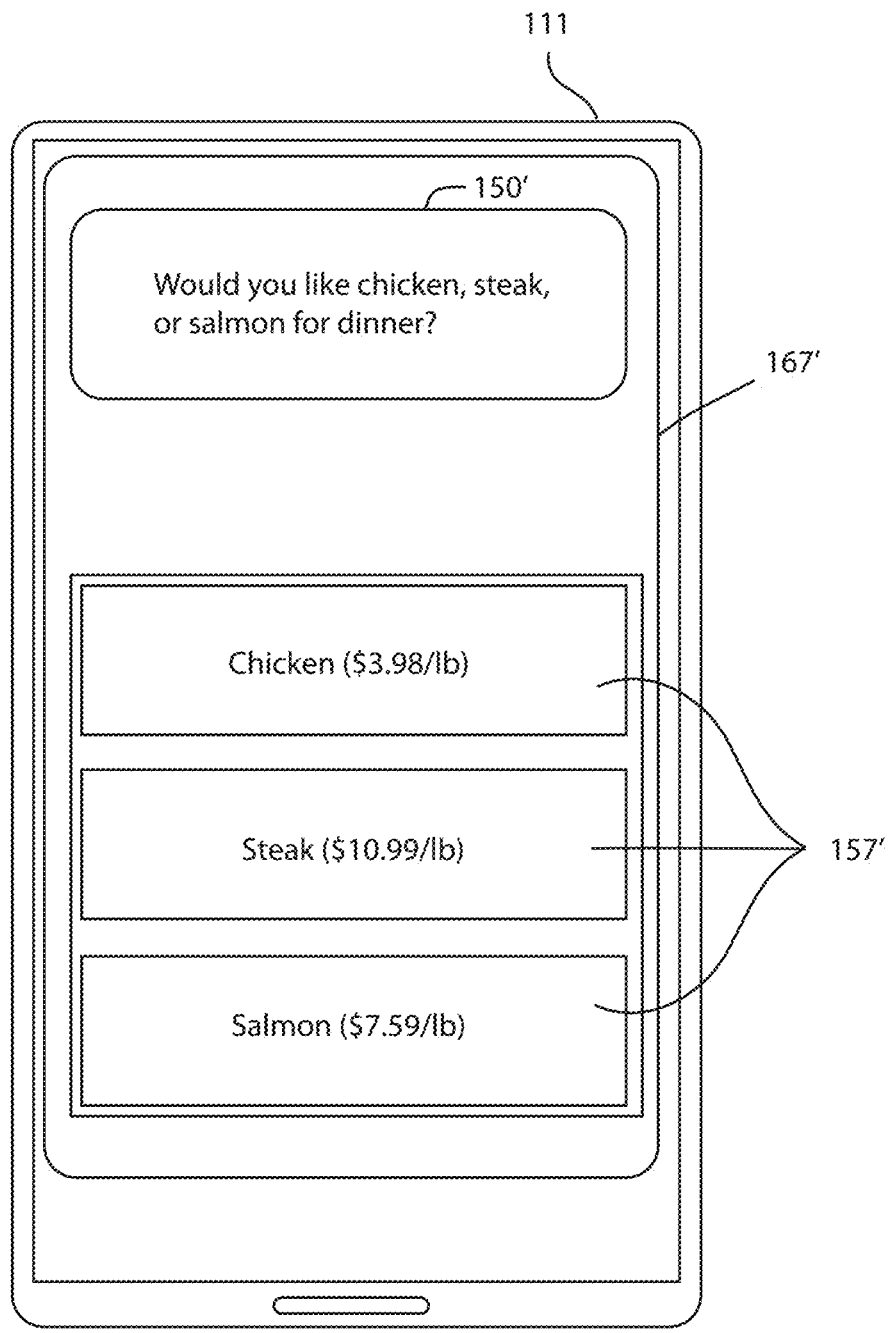
FIG. 6 depicts a graphical user interface of the receiving device showing a message and a plurality of options with contextual information based on a physical location of the receiving device, in accordance with embodiments of the present invention.

Referring now to FIG. 6, embodiments of the computing system 120 may also obtain a location information of the receiving device 111 to determine a venue corresponding to a physical location of the receiving device 111, determine that the venue corresponding to the physical location of the receiving device 111 is relevant to the plurality of options 157', and retrieve a contextual information about the plurality of options 157' based on the venue corresponding to the physical location of the receiving device 111, in the same or similar manner as described above. FIG. 6 depicts a modified graphical user interface 167' of the receiving device 111 showing a message 150' and a plurality of options with contextual information 157' based on a physical location of the receiving device, in accordance with embodiments of the present invention. In this example, a physical location of the receiving device 111 may be associated with a different, relevant venue or may be within a predetermined distance threshold of a different, relevant venue. The modified GUI 167' may display a "price per pound" of "chicken ($3.98/lb)," "steak ($10.99/lb)," and "salmon ($7.59/lb)." The information displayed in modified user interface 167' may be useful for comparing the contextual information associated with the venue of the sending device 110 and the contextual information associated with the venue of the receiving device 111. For example, the contextual information associated with the venue corresponding to the physical location of the receiving device 111 may be the same or different than the contextual information associated with the venue corresponding to the physical location of the sending device 110.

Figure 7:
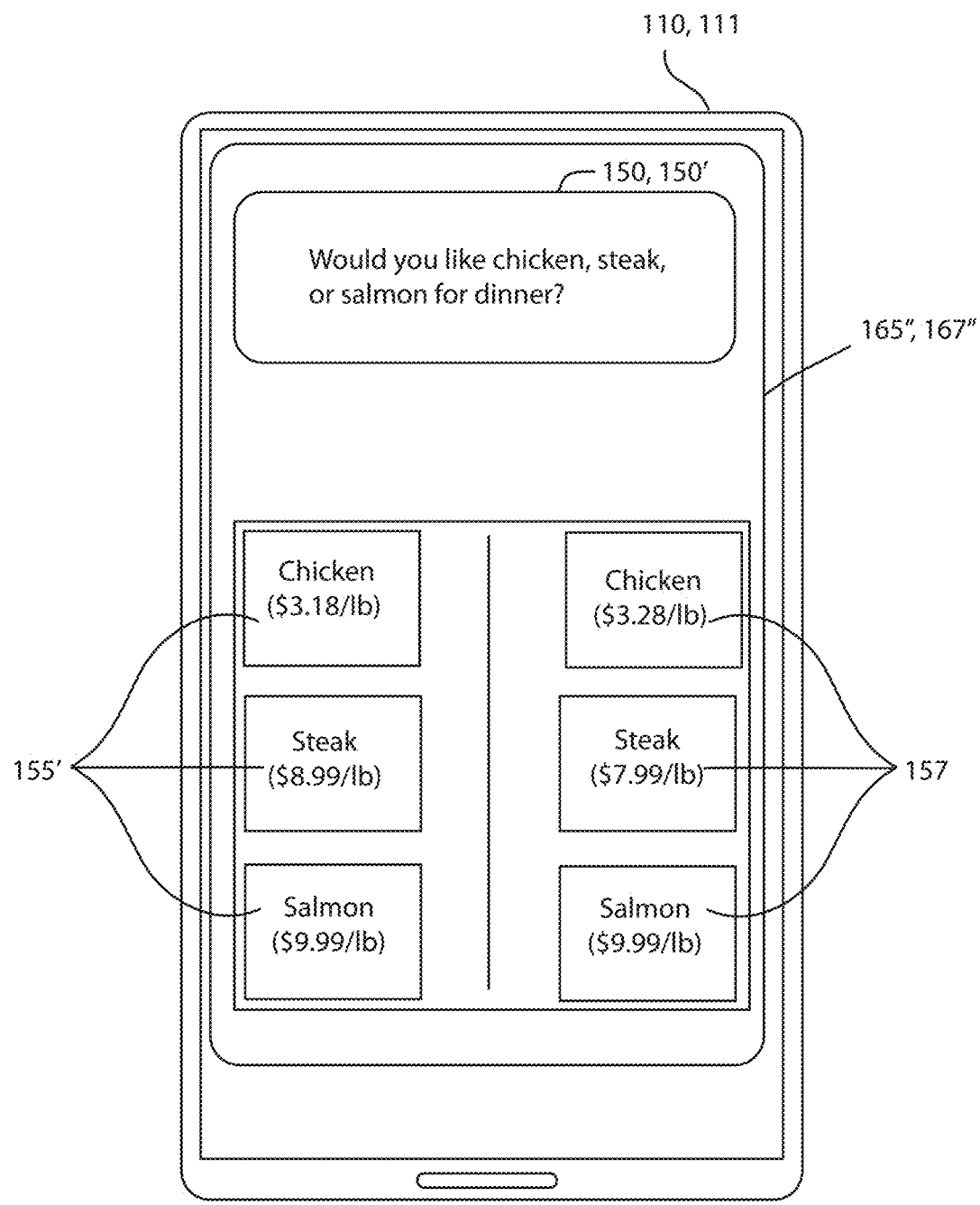
FIG. 7 depicts a personalized appearance of the website of FIG. 5, in accordance with embodiments of the present invention.

The contextual information and the options from each of the sending device 110 and the receiving device 111 may both be displayed in a further modified GUI 165" of the sending device 110 and a further modified GUI 167" of receiving device 111, as shown in FIG. 7. FIG. 7 depicts a further modified GUI 165", 167" showing a comparison of options along with contextual information from different venues corresponding to the physical locations of the sending device 110 and the receiving device 111. Thus, both the sender and the recipient can make better choices by determining which venue has a better deal on a particular option, which can save money and improve efficiency. The sender and recipient may then collectively decide which option may be the best choice in view of the contextual information.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the message augmentation system 100 changes an appearance of GUI using augmentation application 130. The message augmentation system 100 may transform a GUI on a mobile device in accordance with a location of a message sending mobile device. For instance, with the message augmentation system 100, each message sent to a recipient may be augmented by appending contextual information to the message content, thereby improving a GUI to assist a user in making a more cost effective or otherwise more efficient, more intelligent decision. The augmentation system 100 may append text to a display to change the appearance of the GUI of a messaging application to preserve data usage, battery life, and processing resources of a recipient's and/or a sender's mobile device.

Furthermore, the augmentation system 100 improves a speed in which a user can respond to a decision. Without altering the GUI, the message content with options provide no context or additional details for the user. Embodiments of the augmentation system 100 provides a technical solution to the above-drawbacks by altering or otherwise augmenting the GUI to improve an efficiency of providing and locating additional, necessary details to make an informed choice. The technical solution(s) described herein is necessarily rooted in computer technology in order to overcome a problem specifically arising in the realm of GUI modification and contextual information gathering, based on a location of a sender and/or recipient. For instance, instead of a user needing to perform Internet searches or place a phone call to the sender or a venue, the GUI is automatically modified to provide such information, at an individualized level (e.g. based on an individual's location).

Embodiments of the present invention further overcomes technical limitations present in every computing system. Embodiments of the present invention recognize that, for (i) a given time period, (ii) a given display screen, and (iii) a given user, there are limits as to both of the amount and type of information that can effectively be conveyed, by a computing device, to the user via a display screen associated with the user device (e.g. sending device or receiving device), such that the information is understood by the user. Such limits are generally dependent on both the technical limits of the display screen, such as resolution, refresh rate etc. Embodiments of the present invention recognize that certain limits addressed by this technical solution may be, at least in part, related to physical limits of the user. For example, (i) a limit resulting from the ability of the human eye to discern the information presented on a display screen of a given size and resolution and (ii) a limit of the human brain's capacity to comprehend meaning, context, and/or implications of information that is displayed. As such, embodiments of the present invention provide a technical solution for a display screen to convey information, in a meaningful way, to the user, in which the information has been predicted to be of interest to, relevance to, and/or is of benefit to the user. Accordingly, embodiments of the augmentation system 100 provides a technical solution to these technical and physical limitations by adjusting content for display based on a display size, as described in detail supra.

Figure 8:
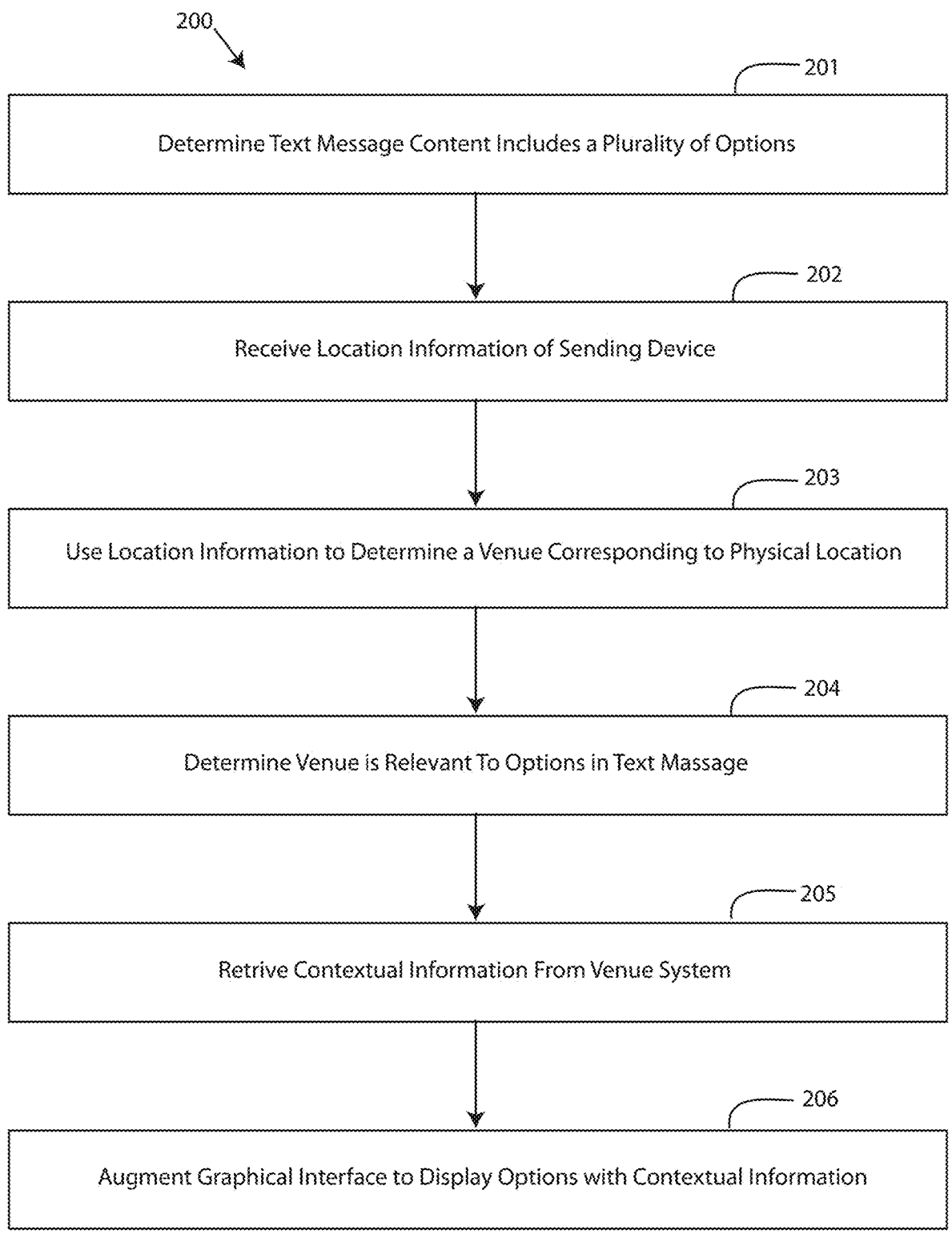
FIG. 8 depicts a flow chart of a method for augmenting a graphical user interface by filtering options within a text message displayed within the graphical user interface, in accordance with embodiments of the present invention.

Referring now to FIG. 8, which depicts a flow chart of a method 200 for augmenting a graphical user interface by filtering options within a text message displayed within the graphical user interface, in accordance with embodiments of the present invention. One embodiment of a method 200 or algorithm that may be implemented for augmenting a graphical user interface by filtering options within a text message displayed within the graphical user interface with the message augmentation system 100 described in FIGS. 1-7 using one or more computer systems as defined generically in FIG. 10 below, and more specifically by the specific embodiments of FIG. 1.

Embodiments of the method 200 for augmenting a graphical user interface by filtering options within a text message displayed within the graphical user interface, in accordance with embodiments of the present invention, may begin at step 201 wherein a message content is determined to contain a plurality of options for selection by a recipient. Step 202 receives a location from a sending device 110. Step 203 uses the location information to determine a venue or nearby venues corresponding to a physical location of the sending device 110. Step 204 determines that the venue or nearby venues are relevant to the options contained with the message. Step 205 retrieves contextual information from a venue system or other venue associated information source and/or database. Step 206 augments a graphical user interface of the sending device 110 to display options with contextual information, configured to be sent to the receiving device 111 and rendered on the GUI of the receiving device 111.

Figure 9:
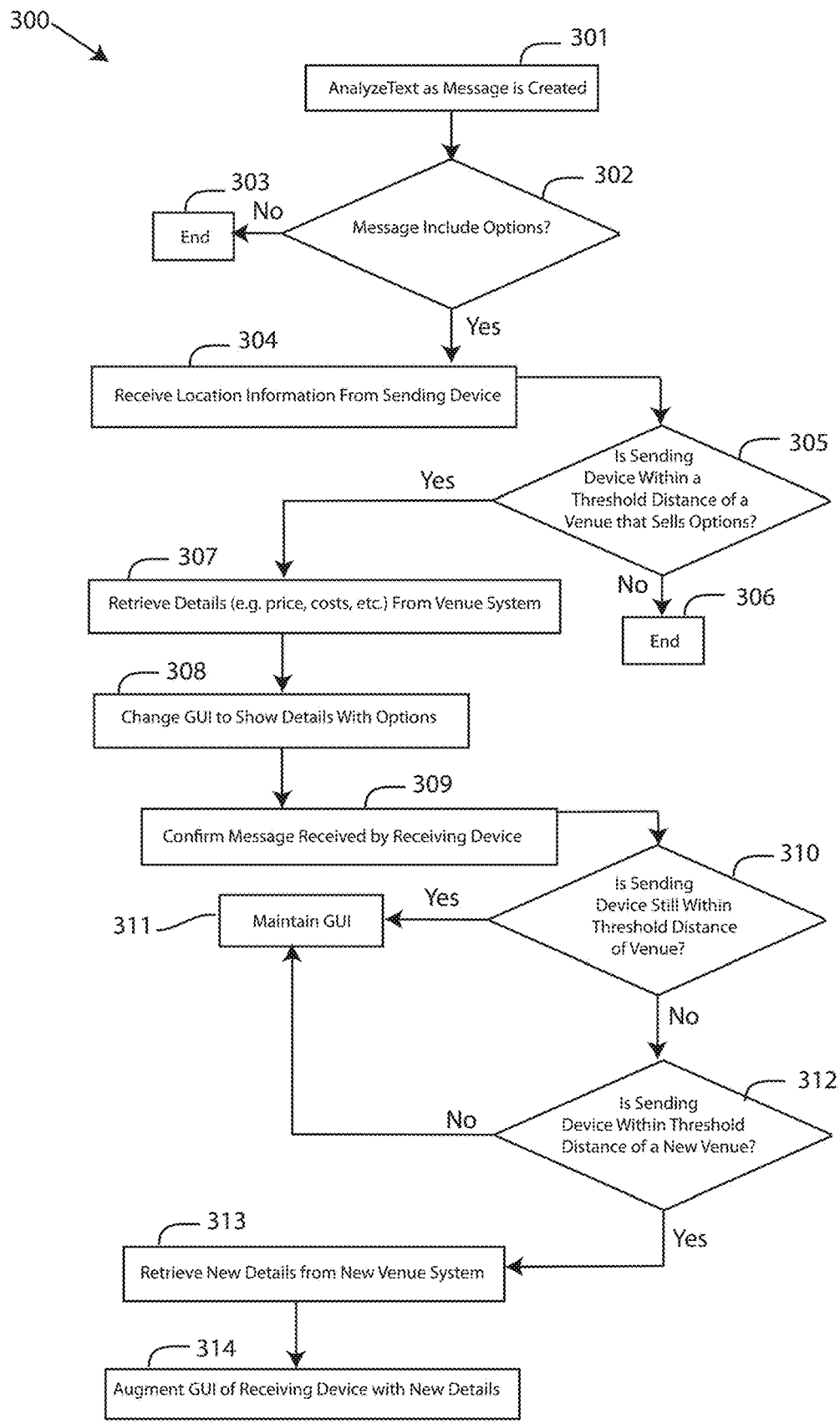
FIG. 9 depicts a detailed flow chart of a method for augmenting a graphical user interface by filtering options within a text message displayed within the graphical user interface, in accordance with embodiments of the present invention.

FIG. 9 depicts a detailed flow chart of a method 300 for augmenting a graphical user interface by filtering options within a text message displayed within the graphical user interface, in accordance with embodiments of the present invention. Step 301 analyzes a text in a message created by a user/sender. Step 302 determines whether the message created/being created includes a plurality of options. If no, then step 303 ends the method 300. If yes, then step 304 receives a location information from a sending device 110. Step 305 determines whether a physical location of the sending device 110 corresponds to a relevant venue and/or if the sending device 110 is within a threshold distance of a venue that sells the options in the message. If not, then step 306 ends the method 300. If yes, then step 307 retrieves additional details (e.g. price, cost per pound) from a venue system and/or venue system database containing price information. Step 308 changes a GUI of the sending device 110 to show the additional details with the options for selection by the recipient. Step 309 confirms that the message is received by the receiving device 111. Step 310 determines whether the sending device 110 is still within threshold distance of relevant venue. If yes, step 311 maintains the GUI, or does not further modify the GUI. If no, step 312 determines whether the sending device 110 is within a threshold distance of a new, relevant venue. If no, then step 311 maintains the GUI, or does not further modify the GUI. If yes, then step 313 retrieves new details from the new venue system/database. Finally, step 314 augments GUI of the receiving device 111 with the new details.

Figure 10:
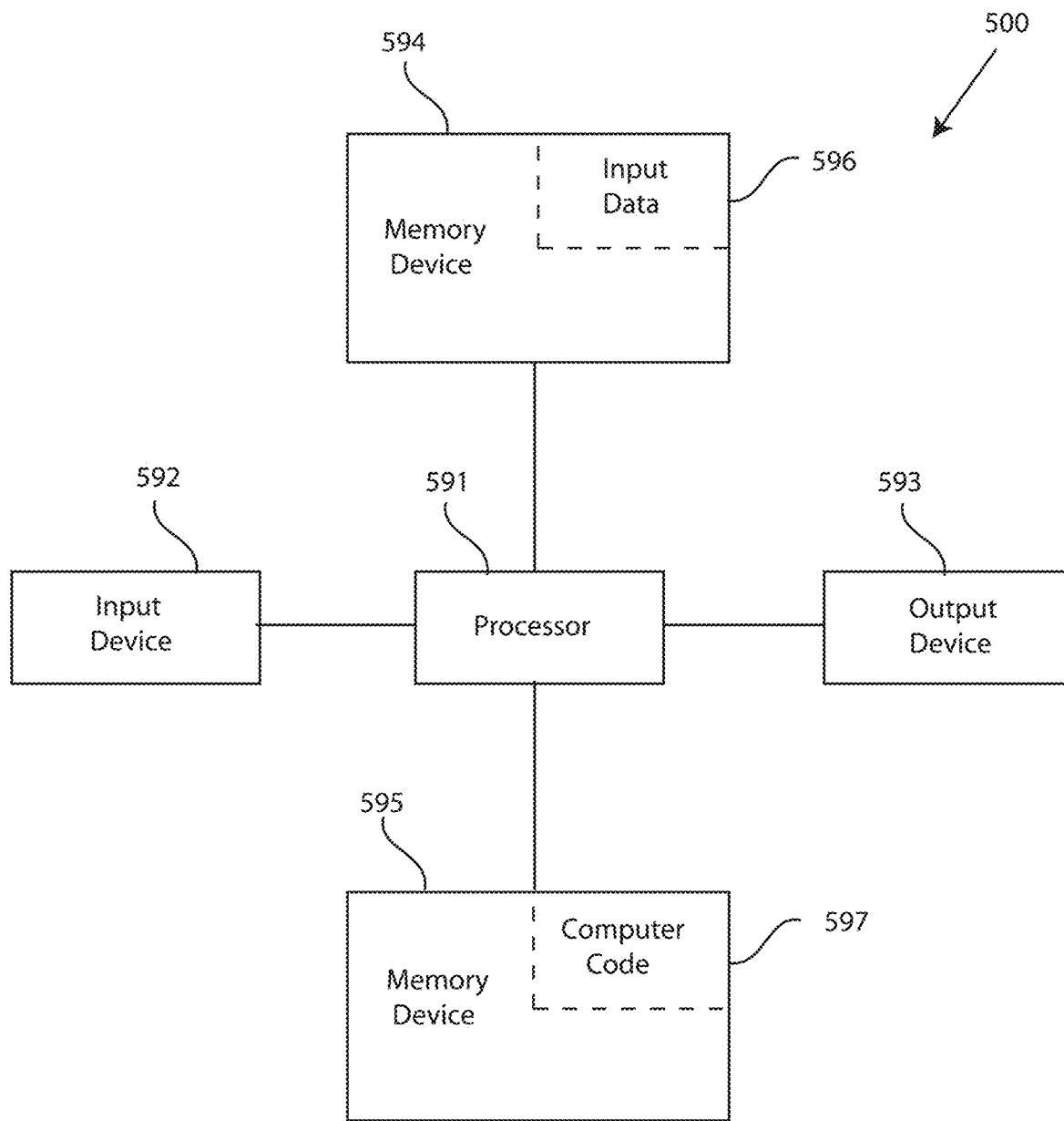
FIG. 10 depicts a block diagram of a computer system for the message augmentation system of FIGS. 1-7, capable of implementing methods for augmenting a graphical user interface by filtering options within a text message displayed within the graphical user interface of FIGS. 8-9, in accordance with embodiments of the present invention.

FIG. 10 depicts a block diagram of a computer system for the message augmentation system 100 of FIGS. 1-7, capable of implementing methods for augmenting a graphical user interface by filtering options within a text message displayed within the graphical user interface of FIGS. 8-9, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for augmenting a graphical user interface by filtering options within a text message displayed within the graphical user interface in the manner prescribed by the embodiments of FIGS. 8-9 using the message augmentation system 100 of FIGS. 1-7, wherein the instructions of the computer code 597 may be executed by processor 591 via memory device 595. The computer code 597 may include software or program instructions that may implement one or more algorithms for implementing the method for augmenting a graphical user interface by filtering options within a text message displayed within the graphical user interface, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 10.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to augmentation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to augment a graphical user interface by filtering options within a text message displayed within the graphical user interface. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for augmenting a graphical user interface by filtering options within a text message displayed within the graphical user interface. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for augmenting a graphical user interface by filtering options within a text message displayed within the graphical user interface.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
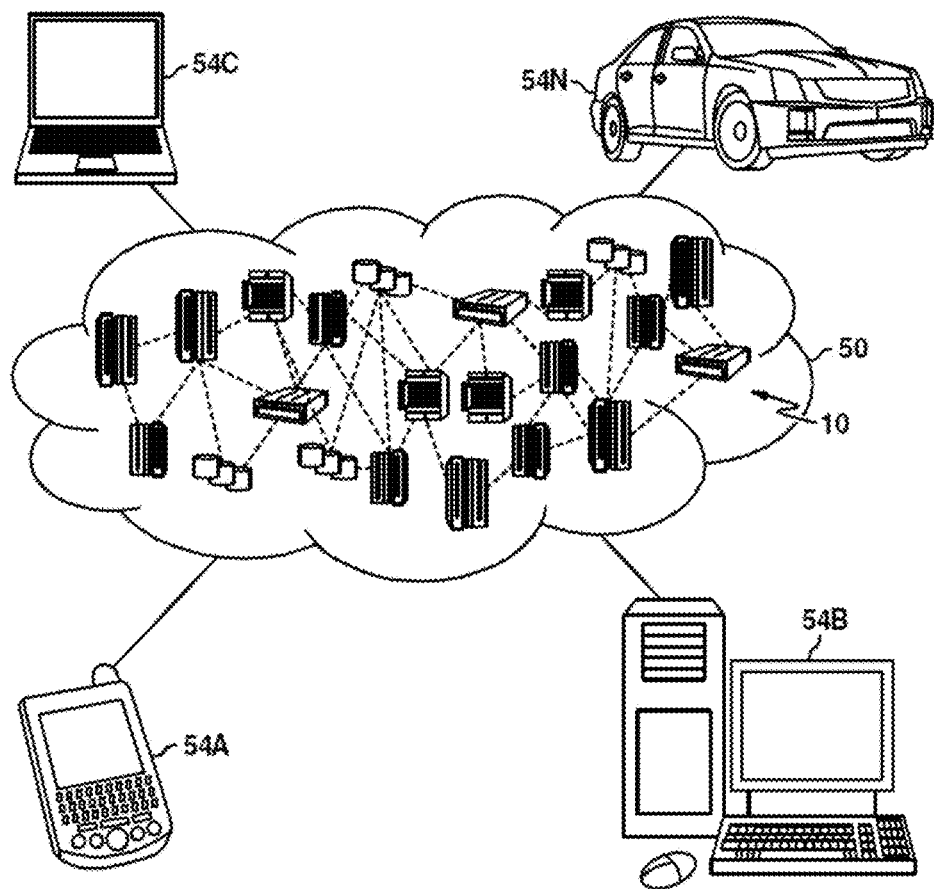
FIG. 11 depicts a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 11 are intended to be illustrative only and that computing nodes 10 and cloud computing environment 50 can communicate with any type of computerized device over any type of network and/or network addressable connection (e.g., using a web browser).

Figure 12:
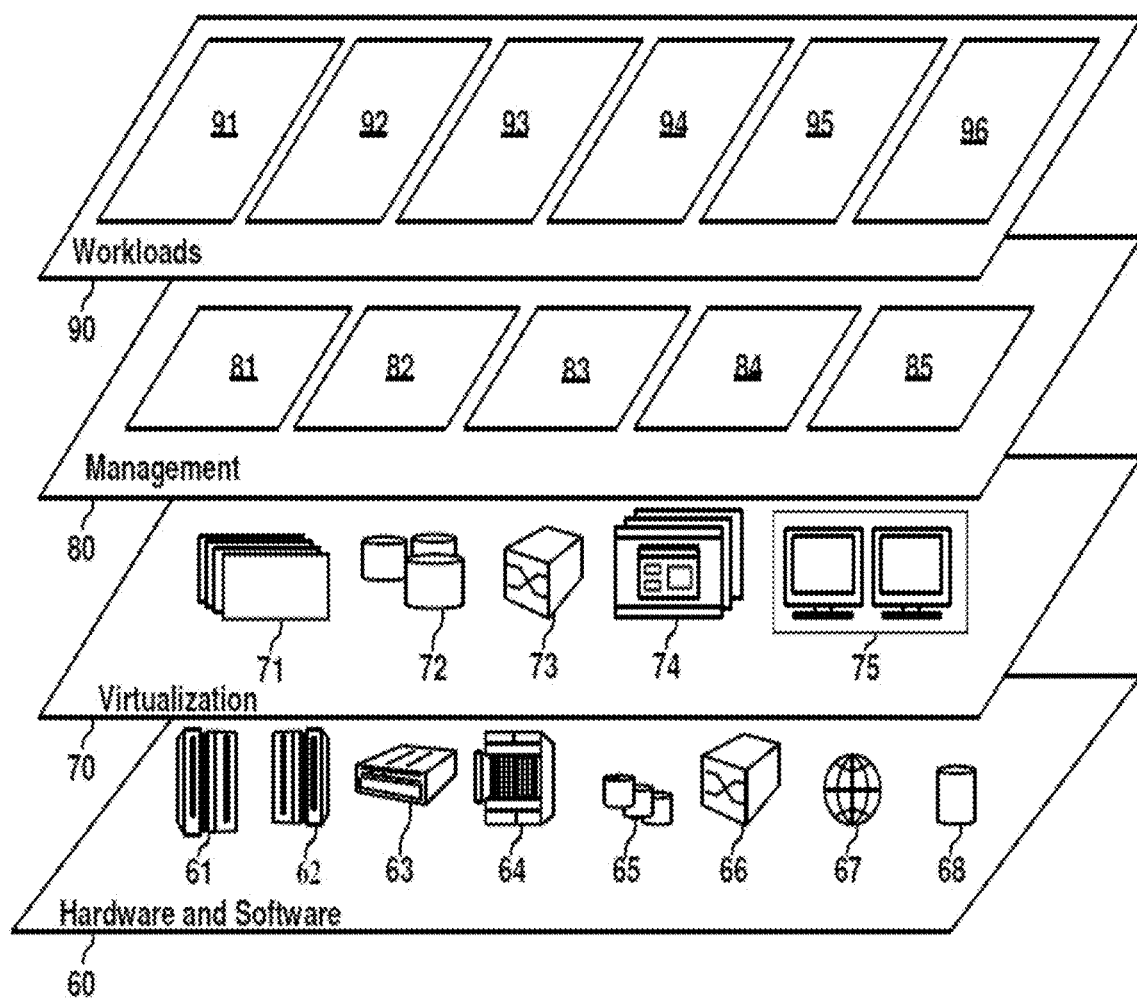
FIG. 12 depicts abstraction model layers, in accordance with embodiments of the present invention.

Referring now to FIG. 12, a set of functional abstraction layers provided by cloud computing environment 50 (see FIG. 11) are shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and message augmentation 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method comprising:
    determining, by a processor of a computing system, that a content of a message displayed by a sending device and intended for a receiving device is an inquiry to a recipient that includes a plurality of options;
    determining, by the processor, that a venue corresponding to a physical location of the sending device and a venue corresponding to the receiving device are both relevant to the plurality of options of the message created by the user of the sending device;
    comparing, by the processor, a contextual information associated with the venue of the sending device and a contextual information associated with the venue of the receiving device; and
    augmenting, by the processor, a graphical user interface of the sending device by appending the contextual information to the plurality of options of the message.

2. The method of claim 1, wherein a location information of the sending device corresponding to the physical location is received from at least one of: a GPS unit of the sending device, one or more beacon devices positioned with the venue, and a location-based application server connected to the sending device.

3. The method of claim 1, wherein a location information of the receiving device corresponding to the physical location is received from at least one of: a GPS unit of the receiving device, one or more beacon devices positioned with the venue, and a location-based application server connected to the receiving device.

4. The method of claim 1, wherein the venue is relevant to the plurality of options when the venue provides an option to purchase the plurality of options.

5. The method of claim 1, wherein the contextual information is selected from the group consisting of: a price, a brand, an in-store availability, a peak business hour, a current wait time, a real-time metric, a capacity, a price by weight, and a related product.

6. The method of claim 1, further comprising: further augmenting, by the processor, the graphical user interface of the receiving device as the physical location of the sending devices changes to a new venue, wherein the further augmenting includes appending an updated contextual information based on the new venue.

7. A computing system, comprising:
a processor;
a memory device coupled to the processor; and
a computer readable storage device coupled to the processor, wherein the storage device contains program code executable by the processor via the memory device to implement a method comprising:
  determining, by a processor of a computing system, that a content of a message displayed by a sending device and intended for a receiving device is an inquiry to a recipient that includes a plurality of options;
  determining, by the processor, that a venue corresponding to a physical location of the sending device and a venue corresponding to the receiving device are both relevant to the plurality of options of the message created by the user of the sending device;
  comparing, by the processor, a contextual information associated with the venue of the sending device and a contextual information associated with the venue of the receiving device; and
  augmenting, by the processor, a graphical user interface of the sending device by appending the contextual information to the plurality of options of the message.

8. The computing system of claim 7, wherein a location information of the sending device corresponding to the physical location is received from at least one of: a UPS unit of the sending device, one or more beacon devices positioned with the venue, and a location-based application server connected to the sending device.

9. The computing system of claim 7, wherein a location information of the receiving device corresponding to the physical location is received from at least one of: a GPS unit of the receiving device, one or more beacon devices positioned with the venue, and a location-based application server connected to the receiving device.

10. The computing system of claim 7, wherein the venue is relevant to the plurality of options when the venue provides an option to purchase the plurality of options.

11. The computing system of claim 7, wherein the contextual information is selected from the group consisting of: a price, a brand, an in-store availability, a peak business hour, a current wait time, a real-time metric, a capacity, a price by weight, and a related product.

12. The computing system of claim 7, further comprising: further augmenting, by the processor, the graphical user interface of the receiving device as the physical location of the sending devices changes to a new venue, wherein the further augmenting includes appending an updated contextual information based on the new venue.

13. A computer program product, comprising a computer readable hardware storage device storing a computer readable program code, the computer readable program code comprising an algorithm that when executed by a computer processor of a computing system implements a method comprising:
  determining, by a processor of a computing system, that a content of a message displayed by a sending device and intended for a receiving device is an inquiry to a recipient that includes a plurality of options;
  determining, by the processor, that a venue corresponding to a physical location of the sending device and a venue corresponding to the receiving device are both relevant to the plurality of options of the message created by the user of the sending device;
  comparing, by the processor, a contextual information associated with the venue of the sending device and a contextual information associated with the venue of the receiving device; and
  augmenting, by the processor, a graphical user interface of the sending device by appending the contextual information to the plurality of options of the message.

14. The computer program product of claim 13, wherein a location information of the sending device corresponding to the physical location is received from at least one of: a GPS unit of the sending device, one or more beacon devices positioned with the venue, and a location-based application server connected to the sending device.

15. The computer program product of claim 13, wherein a location information of the receiving device corresponding to the physical location is received from at least one of: a GPS unit of the receiving device, one or more beacon devices positioned with the venue, and a location-based application server connected to the receiving device.

16. The computer program product of claim 13, wherein the venue is relevant to the plurality of options when the venue provides an option to purchase the plurality of options.

17. The computer program product of claim 13, wherein the contextual information is selected from the group consisting of: a price, a brand, an in-store availability, a peak business hour, a current wait, time, a real-time metric, a capacity, a price by weight, and a related product.

18. The computer program product of claim 13, further comprising: further augmenting, by the processor, the graphical user interface of the receiving device as the physical location of the sending devices changes to a new venue, wherein the further augmenting includes appending an updated contextual information based on the new venue.

* * * * *